United States Patent
Umezawa et al.

(10) Patent No.: US 8,309,239 B2
(45) Date of Patent: Nov. 13, 2012

(54) PERPENDICULAR MAGNETIC RECORDING MEDIUM AND METHOD OF MANUFACTURING THE SAME

(75) Inventors: Teiichiro Umezawa, Singapore (SG);
Masafumi Ishiyama, Singapore (SG);
Kenji Ayama, Singapore (SG);
Tokichiro Sato, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 3 days.

(21) Appl. No.: 12/594,092

(22) PCT Filed: Mar. 28, 2008

(86) PCT No.: PCT/JP2008/056171
§ 371 (c)(1),
(2), (4) Date: Oct. 23, 2009

(87) PCT Pub. No.: WO2008/123445
PCT Pub. Date: Oct. 16, 2008

(65) Prior Publication Data
US 2010/0112379 A1 May 6, 2010

(30) Foreign Application Priority Data
Mar. 30, 2007 (JP) ................................. 2007-095746
Mar. 30, 2007 (JP) ................................. 2007-095748

(51) Int. Cl.
*G11B 5/66* (2006.01)
(52) U.S. Cl. .................................... 428/829; 428/833.5
(58) Field of Classification Search .................. None
See application file for complete search history.

(56) References Cited

U.S. PATENT DOCUMENTS

| 7,537,846 B2 * | 5/2009 | Ishiyama et al. ........... 428/833.3 |
| 2001/0031382 A1 | 10/2001 | Kusakawa et al. |
| 2002/0187369 A1 | 12/2002 | Morikawa |
| 2005/0074636 A1 * | 4/2005 | Moriwaki et al. ...... 428/694 TC |
| 2005/0181240 A1 | 8/2005 | Ishiyama et al. |
| 2006/0088737 A1 | 4/2006 | Hirayama et al. |
| 2006/0222900 A1 * | 10/2006 | Inamura et al. ............... 428/827 |
| 2007/0248843 A1 | 10/2007 | Wu et al. |

(Continued)

FOREIGN PATENT DOCUMENTS

EP 1521245 A1 4/2005

(Continued)

OTHER PUBLICATIONS

Written Opinion and Search Report dated Dec. 1, 2010, in Singapore Patent Application No. 200906484-1, 13 pages.

(Continued)

*Primary Examiner* — Holly Rickman (57) ABSTRACT

A vertical magnetic recording disc (100) includes a base (10), a magnetic recording layer (22), and a medium protection layer (26). The magnetic recording layer (22) is a ferromagnetic layer having a granular structure where a granular portion is formed. The medium protection layer (26) contains nitrogen (N) atoms and carbon (C) atoms with a number ratio (N/C) in a range from 0.050 to 0.150. In a Raman spectrum obtained by exciting the medium protection layer (26) by argon ion laser light of wavelength 514.5 nm, from which a fluorescence is removed, the peak ratio Dh/Gh is in a range from 0.70 to 0.95, when a D peak Dh appearing in the vicinity of 1350 $cm^{-1}$ is separated from G peak Gh appearing in the vicinity of 1520 $cm^{-1}$ by the Gauss function.

7 Claims, 5 Drawing Sheets

U.S. PATENT DOCUMENTS

2009/0257147 A1* 10/2009 Ajan .................... 360/125.02

FOREIGN PATENT DOCUMENTS

| JP | 2-029919 A | 1/1990 |
|---|---|---|
| JP | 5-250663 A | 9/1993 |
| JP | 10-011734 A | 1/1998 |
| JP | 2001-266328 A | 9/2001 |
| JP | 2002-358618 A | 12/2002 |
| JP | 2005-149553 A | 6/2005 |
| JP | 2005-346812 A | 12/2005 |
| JP | 2006-028620 A | 2/2006 |
| JP | 2006-114182 A | 4/2006 |

OTHER PUBLICATIONS

Office Action dated May 7, 2012 in corresponding U.S. Appl. No. 13/164,186, 12 pages.

* cited by examiner

| ITEM | N/C | Dh/Gh | SUBSTRATE TEMPERATURE | SURFACE TREATMENT | MEDIUM PROTECTING LAYER THICKNESS | LUL DURABILITY TEST | PIN-ON-DISK TEST | HIGH FLY WRITE TEST |
|---|---|---|---|---|---|---|---|---|
| CONDITION | 0.05-0.150 | 0.7-0.95 | 110-210°C | 100-350sccm | ~3nm | | 300~ | |
| EXAMPLE 1 | 0.107 | 0.80 | 160 | 250 | 3.0 | > 10⁶ times | 501 | No error |
| EXAMPLE 2 | 0.101 | 0.79 | 135 | 250 | 3.0 | > 10⁶ times | 533 | No error |
| EXAMPLE 3 | 0.095 | 0.77 | 110 | 250 | 3.0 | > 10⁶ times | 563 | No error |
| EXAMPLE 4 | 0.112 | 0.84 | 185 | 250 | 3.0 | > 10⁶ times | 476 | No error |
| EXAMPLE 5 | 0.120 | 0.86 | 210 | 250 | 3.0 | > 10⁶ times | 448 | No error |
| EXAMPLE 6 | 0.150 | 0.95 | 210 | 350 | 3.0 | > 10⁶ times | 322 | No error |
| EXAMPLE 7 | 0.082 | 0.79 | 160 | 200 | 3.0 | > 10⁶ times | 569 | No error |
| EXAMPLE 8 | 0.073 | 0.72 | 160 | 150 | 3.0 | > 10⁶ times | 624 | No error |
| EXAMPLE 9 | 0.122 | 0.85 | 160 | 300 | 3.0 | > 10⁶ times | 445 | No error |
| EXAMPLE 10 | 0.134 | 0.90 | 110 | 350 | 3.0 | > 10⁶ times | 392 | No error |
| EXAMPLE 11 | 0.050 | 0.70 | 110 | 100 | 3.0 | > 10⁶ times | 684 | No error |
| EXAMPLE 12 | 0.115 | 0.87 | 110 | 350 | 3.0 | > 10⁶ times | 450 | No error |
| EXAMPLE 13 | 0.068 | 0.72 | 210 | 100 | 3.0 | > 10⁶ times | 649 | No error |
| COMPARATIVE EXAMPLE 1 | 0.045 | 0.65 | 110 | 90 | 3.0 | > 10⁶ times | 703 | No error |
| COMPARATIVE EXAMPLE 2 | 0.155 | 0.88 | 110 | 360 | 3.0 | Breakdown at 3x10⁵ times | 298 | Error after 12 hrs |
| COMPARATIVE EXAMPLE 3 | 0.052 | 0.67 | 210 | 90 | 3.0 | > 10⁶ times | 678 | Error after 24 hrs |
| COMPARATIVE EXAMPLE 4 | 0.162 | 1.02 | 210 | 360 | 3.0 | Breakdown at 1x10⁵ times | 235 | No error |
| COMPARATIVE EXAMPLE 5 | 0.048 | 0.65 | 100 | 100 | 3.0 | > 10⁶ times | 685 | Error after 12 hrs |
| COMPARATIVE EXAMPLE 6 | 0.049 | 0.69 | 220 | 100 | 3.0 | > 10⁶ times | 688 | Error after 24 hrs |
| COMPARATIVE EXAMPLE 7 | 0.151 | 0.82 | 100 | 350 | 3.0 | Breakdown at 5x10⁵ times | 352 | Error after 12 hrs |
| COMPARATIVE EXAMPLE 8 | 0.153 | 0.99 | 220 | 350 | 3.0 | Breakdown at 2x10⁵ times | 277 | Error after 384 hrs |

PERPENDICULAR MAGNETIC RECORDING MEDIUM AND METHOD OF MANUFACTURING THE SAME

CROSS REFERENCE TO RELATED APPLICATIONS

This application is a National Stage of International Application No. PCT/JP2008/056171 filed Mar. 28, 2008, claiming priority based on Japanese Patent Application Nos. 2007-095746 and 2007-095748 both filed on Mar. 30, 2007, the contents of all of which are incorporated herein by reference in their entirety.

TECHNICAL FIELD

The present invention relates to a perpendicular magnetic recording medium that is loaded on, for example, an HDD (hard disk drive) using a perpendicular magnetic recording system and also relates to a method of manufacturing the medium.

BACKGROUND ART

In accordance with the recent increasing storage capacity in information processing, various types of information recording technologies have been developed. In particular, the surface recording density of an HDD using a magnetic recording technology has been increasing at an annual rate of about 100%. Recently, 2.5-inch-diameter perpendicular magnetic recording disks used in HDDs and the like also have been required to have an information recording capacity of larger than 100 GB per disk. In order to satisfy such a requirement, it is necessary to achieve an information recoding density of higher than 150 Gbits per square inch.

In order to achieve a high recording density in a perpendicular magnetic recording disk used in an HDD or the like, it has been necessary to reduce the size of crystalline magnetic particles constituting a magnetic recording layer for recording information signals and simultaneously to decrease the thickness of the layer. However, in a case of a magnetic disk of a conventionally commercialized in-plane magnetic recording system (also called a longitudinal magnetic recording system or a horizontal magnetic recording system), as a result of the progress in the size reduction of crystalline magnetic particles, thermal stability of recorded signals is deteriorated by the superparamagnetic phenomenon. This causes a so-called thermal fluctuation phenomenon in which the recorded signals are erased. Thus, the reduction in size of crystalline magnetic particles has been a factor that inhibits an increase in recording density of the magnetic disk. In order to solve the inhibitory factor problem, recently, a magnetic disk of a perpendicular magnetic recording system (perpendicular magnetic recording disk) has been proposed.

In the perpendicular magnetic recording system, the axis of easy magnetization of a magnetic recording layer is adjusted so as to be orientated in the direction perpendicular to a surface of a substrate, unlike the case of the in-plane magnetic recording system. The perpendicular magnetic recording system can suppress the thermal fluctuation phenomenon compared to the in-plane recording system and is therefore suitable for increasing the recording density.

In addition, in accordance with such an increase in the information recording density, both the linear recording density (BPI: bit per inch) in the circumferential direction and the track recording density (TPI: track per inch) in the radial direction are growing steadily. Furthermore, a technology for increasing the S/N ratio by narrowing the distance (magnetic spacing) between the magnetic layer of a magnetic disk and the recording/reproduction element of a magnetic head has been investigated. It is recently desired that the flying height of a magnetic head be 10 nm or less.

As one of technologies for thus reducing the magnetic spacing, a DFH (dynamic flying height) head has been proposed. In the DFH head, a magnetic head is thermally expanded by inducing heat in a magnetic head element during the operation of the element so as to slightly protrude in the ABS (air bearing surface) direction. By doing so, the distance between the magnetic head and the magnetic disk is controlled so that the magnetic head can constantly and stably fly with a narrow magnetic spacing.

The perpendicular magnetic recording disk has a medium-protecting layer for protecting the surface of a magnetic recording layer from being damaged when the magnetic head crashes with the perpendicular magnetic recording disk. The medium-protecting layer forms a carbon overcoat (COC), i.e., a coating with a high degree of hardness due to a carbon coating. Furthermore, in some medium-protecting layers, both hard diamond-like bonds of carbon and soft graphite bonds of carbon are present (for example, Patent Document 1). In addition, a technology for producing a diamond-like bond protection film by a CVD (chemical vapor deposition) method is disclosed (for example, Patent Document 2). Furthermore, a technology for enhancing durability of a medium-protecting layer is disclosed (for example, Patent Document 3).

Incidentally, in the perpendicular magnetic recording system, a single-pole-type perpendicular head is employed to generate a magnetic field in the direction perpendicular to the magnetic recording layer, as described above. However, since the magnetic flux emerging from a single-pole end is prone to promptly return to a return magnetic pole on the opposite side, a magnetic field with a sufficient intensity cannot be applied to the magnetic recording layer by using only the single-pole-type perpendicular head. Therefore, a soft magnetic layer is provided under the magnetic recording layer of the perpendicular magnetic recording disk and is used as a path for the magnetic flux. This makes it possible to apply a perpendicular direction magnetic field with a high intensity to the magnetic recording layer.

In addition, a technology preventing the occurrence of spike noise is also known (for example, Patent Document 4). In the technology, the soft magnetic layer is separated into two layers with a spacer layer such that the directions of magnetization are parallel to the perpendicular magnetic recording disk surface and are opposite to each other, that is, to form a so-called AFC (antiferromagnetic exchange coupling) structure. This prevents the occurrence of an enormous magnetic domain in a horizontal direction in the soft magnetic layer and the occurrence of the spike noise due to the leaked magnetic flux in the perpendicular direction, which is generated from the magnetic wall of the magnetic domain.

Furthermore, a lubrication layer is disposed on the medium-protecting layer for protecting the medium-protecting layer and the magnetic head from the crash of the magnetic head. The lubrication layer is formed by, for example, applying and sintering perfluoro polyether.

[Patent Document 1] JP-A-H10-11734
[Patent Document 2] JP-A-2006-114182
[Patent Document 3] JP-A-2005-149553
[Patent Document 4] JP-A-2002-358618

DISCLOSURE OF INVENTION

Problems to be Solved by the Invention

In order to achieve the above-described magnetic spacing of, for example, 10 nm or less, the medium-protecting layer of a perpendicular magnetic recording disk is required to reduce the thickness thereof to 3 nm or less. However, a simple reduction in the thickness of the medium-protecting layer causes deterioration in the durability, such as wear resistance and impact resistance, of the medium-protecting layer itself.

Various methods for forming the medium-protecting layer have been conventionally known. However, since the durability of the conventional medium-protecting layers is insufficient, in a perpendicular magnetic recording disk apparatus of an LUL (load unload) system, an impact when a magnetic recording head is loaded on the perpendicular magnetic recording disk causes a slight scratch or the like on the perpendicular magnetic recording disk. This leads to a problem of a decrease in the reproduced signal.

Furthermore, in also the case of using the above-described DFH head, when a magnetic head is brought into contact with a magnetic disk, a lubrication layer material may be picked up by the magnetic head if the bonding strength of the lubrication layer is low. As a result, the magnetic head is covered with the picked up material. This may cause read/write faults or a high fly write phenomenon due to unstable flying height of the magnetic head. The high fly write is a phenomenon in which data that should be written to a magnetic disk has not been written because the magnetic head departed from the magnetic disk and causes a readout error even if the hardware is not broken.

In also the above-mentioned Patent Document 3, a technology for enhancing the durability of such a medium-protecting layer is described. However, no specific method for solving the problem of high fly write or reducing the thickness of the medium-protecting layer to 3 nm or less are mentioned.

In addition, corrosion is one of problems conventionally involved in magnetic media. The corrosion is a phenomenon, typically, in which a metal such as cobalt (Co) is precipitated from a lower layer and forms an oxide thereof on a surface of the medium-protecting layer. The corrosion erases the data recorded at the position where the corrosion occurred and, in combination with a low flying height of the magnetic head, causes crash failure, which possibly develops into failure in the disk drive.

The present inventors have conducted intensive investigation for solving the problems and have found that heat treatment of a magnetic layer immediately before the formation of a medium-protecting layer changes the properties of the medium-protecting layer formed immediately after the heating, the Raman spectrum of the medium-protecting layer is changed by controlling the temperature of the heat treatment, the bonding strength of a lubrication layer is affected by the amount of nitrogen in the outermost surface of the medium-protecting layer, and the number ratio (N/C) of nitrogen atoms and carbon atoms in the outermost surface of the medium-protecting layer depends on a change in nitrogen flow rate of a surface treatment layer. Therefore, durability, such as wear resistance and impact resistance, of the medium-protecting layer can be enhanced by increasing the diamond-like bonds by heating the magnetic layer immediately before the formation of the medium-protecting layer. This makes it possible to inhibit the occurrence of corrosion.

However, a soft magnetic layer is already formed before the formation of the medium-protecting layer, and the soft magnetic layer has the above-described AFC structure. The AFC structure is weak to heat, and the antiferromagnetic coupling strength of the upper and the lower two layers disposed in antiparallel to each other is reduced by heating to a high temperature, and finally, the function as the AFC structure may be lost. If the AFC structure of the soft magnetic layer is destroyed, noise from the soft magnetic layer is increased, resulting in a difficulty in the achievement of a high recording density.

The present invention has been accomplished in view of the problems involved in the configuration of the conventional medium-protecting layer, and an object of the present invention is to provide a perpendicular magnetic recording medium that has enhanced durability, such as wear resistance and impact resistance, and is able to avoid various problems, such as high fly write and corrosion, even if the thickness of the medium-protecting layer is reduced to 3 nm or less, by preventing the pick up of a lubrication layer material to the magnetic head and to provide a method of manufacturing such a recording medium.

Means for Solving the Problems

In order to solve the above-mentioned problems, according to one aspect of the present invention, there is provided a perpendicular magnetic recording medium comprising a magnetic recording layer on a substrate, and a medium-protecting layer on the magnetic recording layer, wherein the magnetic recording layer is a ferromagnetic layer of a granular structure having grain boundaries formed by a non-magnetic material among crystalline particles grown in a columnar shape and containing at least cobalt (Co); and the medium-protecting layer is composed of a coating that includes carbon as a main component and nitrogen contained in a surface layer at a number ratio (N/C) of nitrogen (N) atoms and carbon (C) atoms of 0.050 to 0.150, and in a spectrum removed fluorescence from a Raman spectrum in wavenumbers of 900 to 1800 $cm^{-1}$ obtained by exciting the medium-protecting layer with argon ion laser light having a 514.5 nm wavelength, a peak ratio Dh/Gh when a D peak Dh appearing near 1350 $cm^{-1}$ and a G peak Gh appearing near 1520 $cm^{-1}$ are waveform-separated by a Gaussian function is 0.70 to 0.95.

By the constitution of heating a magnetic layer immediately before the formation of the medium-protecting layer, the peak ratio Dh/Gh in a Raman spectrum can be controlled to 0.70 to 0.95, and the durability such as impact resistance, wear resistance, and corrosion resistance can be enhanced. In addition, the problem of high fly write and the crash of the magnetic head can be avoided by regulating the ratio (N/C) to 0.050 to 0.150.

The perpendicular magnetic recording medium is formed so as to have an antiferromagnetic exchange coupling (AFC) structure containing 30 to 70 at % iron (Fe), and a soft magnetic layer having a saturation magnetization Ms of 1.2 T or more may be provided under the magnetic recording layer. The soft magnetic layer is separated into two layers with a spacer layer therebetween and is configured such that the magnetization directions are parallel to the disk surface of the perpendicular magnetic recording medium and are opposite to each other. In the thus configured antiferromagnetic exchange coupling (AFC: antiferromagnetic exchange coupling, hereinafter simply referred to as AFC) structure, the antiferromagnetic coupling strength of the upper and the lower two layers disposed in antiparallel to each other is reduced by heating at a prescribed temperature or more. In the present invention, an AFC structure that is strong to heat is formed by mixing iron to the soft magnetic layer during the formation thereof, which makes it possible to conduct the heating immediately before the formation of the medium-protecting layer. In addition, the saturation magnetization Ms affects the easiness of write to the recording medium, that is, affects the overwrite characteristics. A higher saturation magnetization Ms achieves higher improvement of the overwrite characteristics. Therefore, a constitution that provides a saturation magnetization Ms of 1.2 T or more can maintain desired overwrite characteristics.

Furthermore, the soft magnetic layer may have an exchange coupling magnetic field Hex of 40 Oe or more. The coupling strength of the AFC structure is determined on the basis of the exchange coupling magnetic field Hex. Therefore, a higher Hex indicates a stronger coupling of the AFC, and a Hex of lower than 40 Oe cannot maintain the function as an AFC structure.

The magnetic recording layer is formed so as to have a granular structure, and a capped layer or an auxiliary recording layer may be provided on the magnetic recording layer. Such a constitution can reduce the size of magnetic particles of the magnetic recording layer and enhance coercivity Hc. Therefore, the high-density recording properties and the low-noise properties of the magnetic recording layer can be enhanced. In addition, the perpendicular magnetic recording medium can be further imparted with high thermal fluctuation resistance by providing the capped layer on the magnetic recording layer.

The composition of the capped layer may be CoCrPtB. With this, a thin film showing a perpendicular magnetic anisotropy can be formed to enhance the high thermal fluctuation resistance of the perpendicular magnetic recording medium.

In order to solve the above-mentioned problems, according to another aspect of the present invention, there is provided a method of manufacturing a perpendicular magnetic recording medium including a magnetic recording layer on a substrate, and a medium-protecting layer composed of a coating including carbon as a main component on the magnetic recording layer, comprising forming a ferromagnetic layer of a granular structure having grain boundaries formed by a non-magnetic material among crystalline particles grown in a columnar shape and containing at least cobalt (Co), as the magnetic recording layer; heating the perpendicular magnetic recording medium such that in a spectrum removed fluorescence from a Raman spectrum of a medium-protecting layer formed later in wavenumbers of 900 to 1800 cm$^{-1}$ obtained by exciting the medium-protecting layer with argon ion laser light having a 514.5 nm wavelength, a peak ratio Dh/Gh when a D peak Dh appearing near 1350 cm$^{-1}$ and a G peak Gh appearing near 1520 cm$^{-1}$ are waveform-separated by a Gaussian function is 0.70 to 0.95; forming the medium-protecting layer by a CVD method; and exposing the medium-protecting layer with nitrogen such that the number ratio (N/C) of nitrogen (N) atoms and carbon (C) atoms is 0.050 to 0.150.

By forming the perpendicular magnetic recording medium such that the peak ratio Dh/Gh in a Raman spectrum is 0.70 to 0.95 and the ratio (N/C) is 0.050 to 0.150, the durability, such as wear resistance and impact resistance, is enhanced to enable avoidance of various problems such as high fly write even if the thickness of the medium-protecting layer is restricted to 3 nm or less.

Before the formation of the magnetic recording layer, a soft magnetic layer having an antiferromagnetic exchange coupling (AFC) structure containing 30 to 70 at % iron (Fe) may be formed. The soft magnetic layer may have an exchange coupling magnetic field Hex of 40 Oe or more.

After the formation of the magnetic recording layer, a capped layer having a granular structure may be formed. The composition of the capped layer may be CoCrPtB.

The heating may be performed at a temperature of 157 to 204° C. When the heat treatment is performed immediately before the formation of the medium-protecting layer, the carbon atoms decomposed by plasma can reach a substrate while maintaining the high energy level. Since the carbon atoms maintaining the high energy level are used for forming a film on the substrate on a magnetic film, a medium-protecting layer with high density and high durability can be formed. Furthermore, the heating of the magnetic layer at a high temperature enhances the adhesion between the magnetic layer and the medium-protecting layer.

After the formation of the medium-protecting layer, the medium-protecting layer may be further exposed to a nitrogen atmosphere at a flow rate of 100 to 350 sccm for surface treatment. The exposure to the nitrogen atmosphere at a flow rate of 100 to 350 sccm regulates the number ratio (N/C) of nitrogen (N) atoms and carbon (C) atoms to 0.050 to 0.150, and the medium-protecting layer formed by CVD is provided with suitable adhesion to a lubrication layer and suitable hardness.

Furthermore, a lubrication layer containing a perfluoro polyether compound having a hydroxyl group in an end group may be formed.

The perfluoro polyether has a linear-chain structure and exhibits lubrication performance suitable for the perpendicular magnetic recording medium and also can exhibit high adhesion performance to the medium-protecting layer due to the hydroxyl (OH) group residing in the end group. In particular, in the configuration of the present invention in which a surface treatment layer containing nitrogen is provided on a surface of the medium-protecting layer, a high adhesion rate of the lubrication layer can be obtained because of the high compatibility between (N$^+$) and (OH$^-$).

Advantages

As described above, according to the perpendicular magnetic recording medium of the present invention, the durability, such as wear resistance and impact resistance, is enhanced, and various problems, such as high fly write, can be avoided by preventing the pick up of the lubrication layer material to the magnetic head, even if the thickness of the medium-protecting layer is reduced to 3 nm or less.

BEST MODES FOR CARRYING OUT THE INVENTION

Preferred embodiments of the present invention will be described in detail with reference to the accompanied drawings below. Incidentally, the sizes, materials, and other specific numeric values shown in the following embodiments are only examples provided for better understanding of the invention, and the present invention is not limited thereto unless otherwise specifically indicated.

Figure 1:
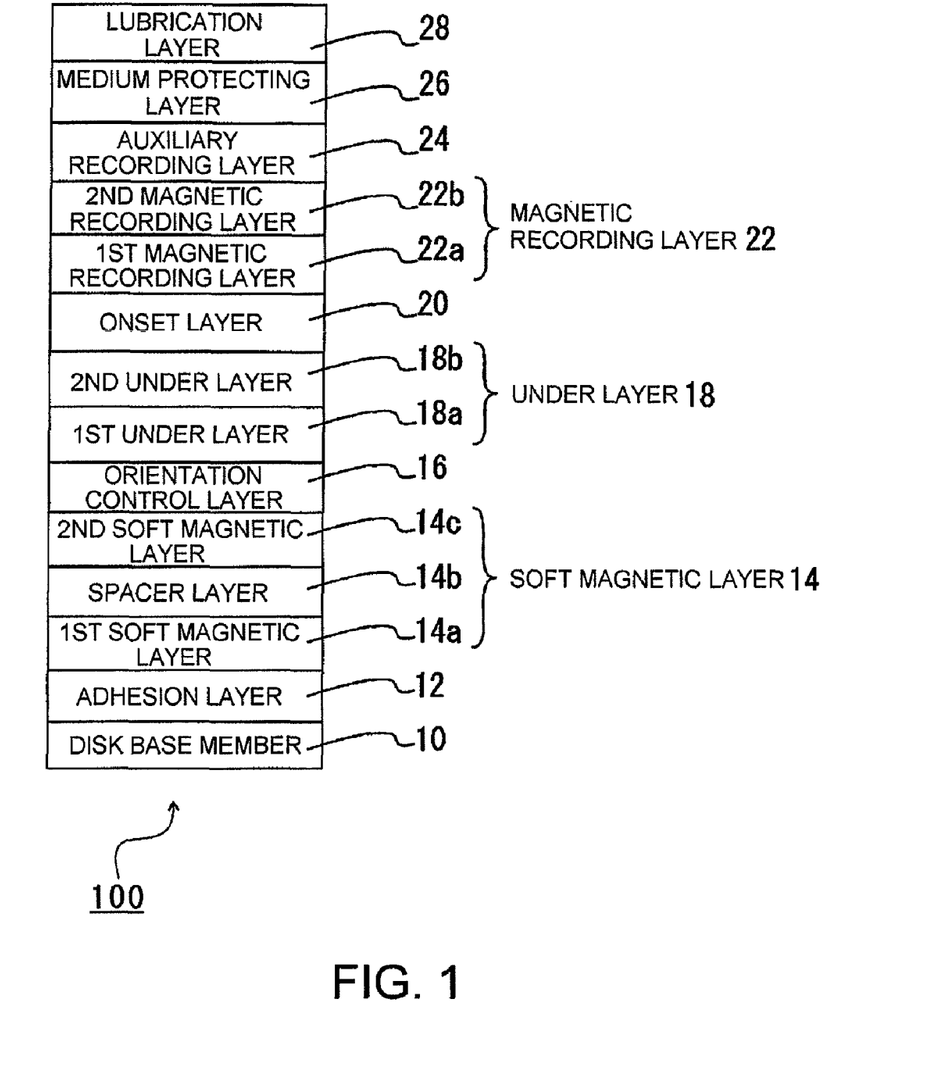
FIG. 1 is a diagram illustrating a structure of a perpendicular magnetic recording disk according to an embodiment.

FIG. 1 is a diagram illustrating a structure of a perpendicular magnetic recording disk 100 as a perpendicular magnetic recording medium according to an embodiment. The perpendicular magnetic recording disk 100 shown in FIG. 1 is configured of a disk substrate 10, an adhesion layer 12, a first soft magnetic layer 14a, a spacer layer 14b, a second soft magnetic layer 14c, an orientation control layer 16, a first under layer 18a, a second under layer 18b, an onset layer 20, a first magnetic recording layer 22a, a second magnetic recording layer 22b, a capped layer 24, a medium-protecting layer 26, and a lubrication layer 28. The first soft magnetic layer 14a, the spacer layer 14b, and the second soft magnetic layer 14c collectively constitute a soft magnetic layer 14. The first under layer 18a and the second under layer 18b collectively constitute an under layer 18. The first magnetic recording layer 22a and the second magnetic recording layer 22b collectively constitute a magnetic recording layer 22.

First, amorphous aluminosilicate glass was formed into a disk-like shape by a direct press to produce a glass disk. The glass disk was successively subjected to grinding, polishing, and chemical strengthening to obtain a smooth non-magnetic disk substrate 10 made of a chemically strengthened glass disk.

Since the aluminosilicate glass can provide smoothness and high rigidity, the magnetic spacing, in particular, the flying height of a magnetic head can be reduced more stably. Furthermore, the aluminosilicate glass can be provided with a high degree of rigidity by the chemical strengthening.

On the resulting disk substrate 10, from the adhesion layer 12 to the capped layer 24 were successively formed by a DC magnetron sputtering process in an Ar atmosphere using a vacuumed film-forming apparatus, and the medium-protecting layer 26 was formed by a CVD method. Then, the lubrication layer 28 was formed by a dip-coating method. In addition, from the standpoint of enabling the formation of an even film, it is also preferred to use an in-line type film forming method. The configuration of each layer and a production process thereof will be described in detail below.

The adhesion layer 12 was formed using a Ti-alloy target so as to be a Ti-alloy layer of a 10 nm. By forming the adhesion layer 12, the adhesion between the disk substrate 10 and the soft magnetic layer 14 can be enhanced and, therefore, it is possible to prevent peeling of the soft magnetic layer 14. As a material of the adhesion layer 12, for example, a CrTi alloy can be used. From a practical viewpoint, the thickness of the adhesion layer is preferably set to 1 to 50 nm.

The soft magnetic layer 14 was configured so as to have an AFC by disposing a non-magnetic spacer layer 14b between the first soft magnetic layer 14a and the second soft magnetic layer 14c. By doing so, the magnetization direction of the soft magnetic layer 14 can be arranged along the magnetic path (magnetic circuit) with high precision, and the vertical component of the magnetization is significantly decreased, which can reduce the noise generated by the soft magnetic layer 14.

Figure 2:
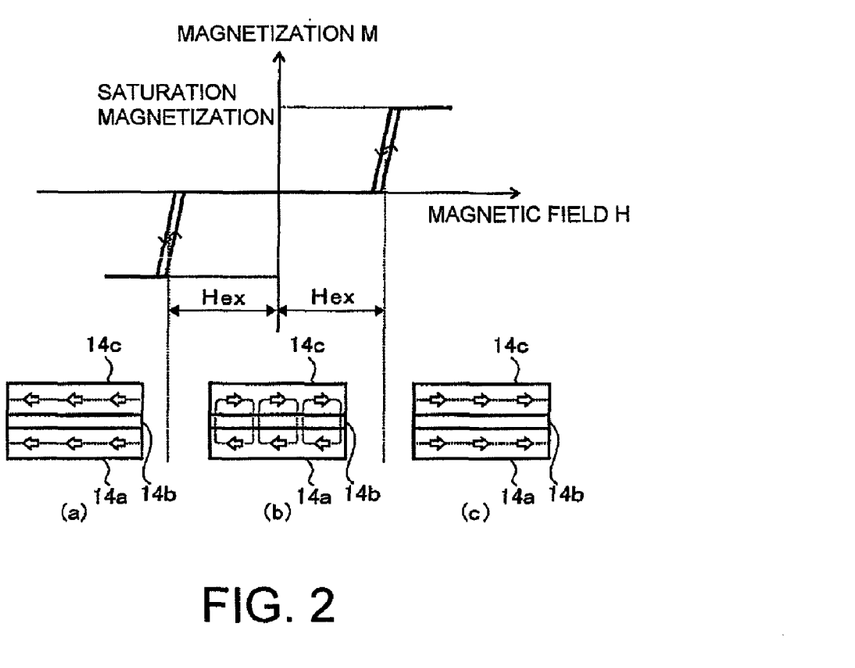
FIG. 2 is an explanatory diagram illustrating magnetic characteristics in an AFC structure.

FIG. 2 is an explanatory diagram illustrating magnetic characteristics in an AFC structure. Referring to such magnetic characteristics, the soft magnetic layer not having an AFC structure maintains a positively or negatively magnetized state when a magnetic field H is not applied thereto. However, as shown in (b), the soft magnetic layer having an AFC structure forms closed paths of magnetic fluxes between the first soft magnetic layer 14a and the second soft magnetic layer 14c, and the magnetization M becomes 0, when a magnetic field H is not applied. Then, as shown in (a) and (c), the magnetic fluxes of the soft magnetic layers 14a and 14c are oriented to the same direction by applying a magnetic field H to either direction.

The strength of the coupling of the AFC structure is determined on the basis of the exchange coupling magnetic field Hex shown in FIG. 2. A higher Hex indicates a stronger coupling of AFC. Such Hex is set so as to be magnetized with the magnetic field for writing to the corresponding magnetic recording layer 22 and so as not to be magnetized with the magnetic field for writing to the adjacent magnetic recording layer 22. The intensity of the Hex can be increased by reducing the thickness, but a simple reduction in the thickness causes insufficient absorption of the magnetic flux from the magnetic head. Therefore, the thickness is necessarily reduced according to the magnetic flux from the magnetic head.

The magnetization M of the soft magnetic layer having an AFC structure is increased in accordance with the application of the magnetic field H to a certain value and then to a saturated state. The value of the magnetization M at the saturated state is called a saturation magnetization Ms. An increase in the saturation magnetization Ms enhances the easiness of write to a recording medium, that is, enhances the overwrite characteristics. The saturation magnetization Ms is preferably 1.2 T or more. By doing so, it is possible to maintain desired overwrite characteristics.

Furthermore, the magnetic moment indicating the magnetic intensity of a magnetic film is expressed by, Ms·t, the product of the saturation magnetization Ms and the thickness t of the film. Therefore, in order to obtain a magnetic moment Ms·t of a desired intensity, it is necessary to increase the thickness of the film when the saturation magnetization Ms is low. However, the coupling strength of the AFC is decreased with an increase in the thickness of a film, resulting in a reduction in Hex. Therefore, it is preferable that the magnetic moment Ms·t of a certain intensity be obtained with a possible maximum saturation magnetization Ms and a possible minimum thickness t.

In the thus configured AFC structure, the coupling of axes of easy magnetization of the upper and the lower two layers disposed in antiparallel to each other is usually destroyed by heat of a certain temperature or higher. This reduces the S/N ratio. In the embodiment, an AFC structure that is strong to heat is formed by mixing iron to the soft magnetic layer during the formation thereof. This makes the below-described heating immediately before the formation of the medium-protecting layer possible. Therefore, the first soft magnetic layer 14a and the second soft magnetic layer 14c each have a composition of CoCrFeB containing 30 to 70 at % Fe, and the spacer layer 14b has a composition of Ru (ruthenium).

The orientation control layer 16 has an effect of protecting the soft magnetic layer 14 and an effect of enhancing the orientation arrangement of crystalline particles of the under layer 18. The orientation control layer 16 was a NiW or NiCr layer having an fcc structure.

The under layer 18 has a two-layer structure made of Ru. The crystal orientation properties can be improved by forming the second under layer 18b on the upper layer side under an Ar gas pressure higher than that for forming the first under layer 18a on the lower layer side.

The onset layer 20 is a non-magnetic granular layer. The non-magnetic granular layer is formed on an hcp crystal structure of the under layer 18, and then a granular layer as the first magnetic recording layer 22a is made to grow on the non-magnetic granular layer. This has an effect to separate the magnetic granular layer from the beginning stage (start-up). The composition of the onset layer 20 was non-magnetic CoCr—$SiO_2$.

The magnetic recording layer 22 is configured of a first magnetic recording layer 22a having a small thickness and a second magnetic recording layer 22b having a large thickness.

The first magnetic recording layer 22a was formed so as to have a 2 nm CoCrPt—$Cr_2O_3$ hcp crystal structure using a hard magnetic target composed of CoCrPt containing chromium oxide ($Cr_2O_3$) as an example of the non-magnetic material. The non-magnetic material was segregated at the surroundings of a magnetic material to form grain boundaries, and the magnetic particles (magnetic grains) formed a columnar granular structure. The magnetic particles epitaxially grew continuously from the granular structure of the onset layer.

The second magnetic recording layer 22b was formed so as to have a 10 nm CoCrPt—$TiO_2$ hcp crystal structure using a hard magnetic target composed of CoCrPt containing titanium oxide ($TiO_2$) as an example of the non-magnetic material. In also the second magnetic recording layer 22b, the magnetic particles formed a granular structure.

The capped layer 24 is a thin film (continuous layer) formed on the granular magnetic layer and showing a strong perpendicular magnetic anisotropy and configures a CGC (coupled granular continuous) structure. By doing so, high thermal fluctuation resistance of the continuous film, in addition to the high-density recording properties and the low-noise properties of the granular layer, can be provided. The composition of the capped layer 24 was CoCrPtB.

The medium-protecting layer 26 is a medium-protecting layer for protecting the perpendicular magnetic recording layer from impact of the magnetic head.

In such a medium-protecting layer 26, a metal such as cobalt (Co) is precipitated from a lower layer to form an oxide thereof on a surface of the medium-protecting layer, that is, so-called corrosion occurs. The corrosion erases the data recorded at the position where the corrosion occurred and, in combination with a low flying height of the magnetic head, causes crash failure, which possibly develops into failure in the disk drive.

In the embodiment, the occurrence of corrosion is inhibited by increasing the diamond-like bonds by heating the magnetic layer immediately before the formation of the medium-protecting layer 26 for enhancing the durability, such as wear resistance and impact resistance, of the medium-protecting layer 26. However, the AFC structure of the soft magnetic layer that is already formed before the formation of the medium-protecting layer 26 is usually weak to heat, and the coupling of axes of easy magnetization of the upper and the lower two layers disposed in antiparallel to each other is destroyed by heating the magnetic layer. Finally, the function as the AFC structure is lost. In the embodiment, as described above, an AFC structure containing Fe and thereby being excellent in heat resistance was configured for enabling the heating of the magnetic layer immediately before the formation of the medium-protecting layer 26.

Thus, by heating the magnetic layer immediately before the formation of the medium-protecting layer 26, the properties of the medium-protecting layer 26 formed immediately after the heating are changed. In the embodiment, in particular, the Raman spectrum (the ratio of diamond-like bonds and graphite-like bonds) is changed, and the resistance of the medium-protecting layer 26 is enhanced with an increase in the diamond-like bonds. The heat treatment is conducted such that the medium-protecting layer 26 later formed has a peak ratio Dh/Gh in the range of 0.70 to 0.95.

Here, the peak ratio Dh/Gh is a ratio of Dh and Gh when a Raman spectrum in wavenumbers of 900 to 1800 $cm^{-1}$ obtained by exciting the medium-protecting layer with argon ion laser light having a 514.5 nm wavelength is measured, background due to fluorescence is amended to straight-line approximation, and the D peak Dh appearing near the lower wavenumber side (1350 $cm^{-1}$) of the spectrum and the G peak Gh appearing near the higher wavenumber side (1520 $cm^{-1}$) are waveform-separated by a Gaussian function.

When the Dh/Gh is less than 0.70, the hardness of the medium-protecting film is insufficient, and a Dh/Gh of 0.95 or more may reduce the hardness of the medium-protecting layer. Therefore, the Dh/Gh is controlled to 0.70 to 0.95. By controlling the Dh/Gh within the range of 0.70 to 0.95, the medium-protecting layer formed by CVD can have suitable hardness and sufficient durability.

Specific heating temperature for controlling the peak ratio Dh/Gh to 0.70 to 0.95 is, for example, in a temperature range of 157 to 204° C. When the temperature for forming the film is lower than 157° C., the kinetic energy of carbon atoms is low to reduce the density of the medium-protecting layer, and a temperature higher than 204° C. causes diffusion of the magnetic layer itself to deteriorate the magnetic characteristics. Accordingly, the temperature of the perpendicular magnetic recording disk 100 was regulated to 157 to 204° C. immediately before the formation of the medium-protecting layer 26 and after the formation of the magnetic layer. Therefore, the medium-protecting layer having high degrees of density and hardness can be formed by heating the magnetic layer to 157 to 204° C.

When the heat treatment is conducted immediately before the formation of the medium-protecting layer 26 as described above, during the formation of the medium-protecting layer 26, carbon atoms decomposed by plasma reach the perpendicular magnetic recording disk 100 while maintaining a high energy level and are used for the formation of a film. Therefore, the medium-protecting layer 26 can be formed so as to have high density and high durability. In addition, the heating of the magnetic layer at a high temperature enhances the adhesion between the magnetic layer and the medium-protecting layer.

After such heat treatment, the medium-protecting layer 26 is formed from carbon by a plasma CVD method. In the case that the medium-protecting layer of a hydrocarbon is formed by plasma CVD, it is desirable to form diamond-like bonds by using only hydrocarbon gas as the reactive gas. This is because that if another inert gas (for example, Ar) or a carrier gas such as hydrogen gas is used by being mixed with hydrocarbon gas, such impure gas is incorporated into the medium-protecting layer and reduces the film density.

Incidentally, as the reactive gas, a hydrocarbon (carbon hydride), in particular, a lower hydrocarbon is preferably used, and a straight-chain lower saturated hydrocarbon or a straight-chain lower unsaturated hydrocarbon is more preferably used. As the straight-chain lower saturated hydrocarbon, for example, methane, ethane, propane, butane, pentane, hexane, heptane, or octane may be used. As the straight-chain lower unsaturated hydrocarbon, for example, ethylene, propylene, butylene, or acetylene may be used. In addition, the term "lower" used herein means a hydrocarbon having 1 to 10 carbon atoms per molecule.

In accordance with an increase in the number of carbon atoms, it becomes difficult to gasify the hydrocarbon and supply the gasified hydrocarbon to a film-forming apparatus, and also decomposition during the plasma discharging becomes difficult. Accordingly, the straight-chain lower hydrocarbon is preferably used.

In addition, in accordance with an increase in the number of carbon atoms, the component of the resulting medium-protecting layer is prone to contain a large amount of high-molecular hydrocarbons and reduces the density and the hardness of the medium-protecting layer. Furthermore, it is cited that cyclic hydrocarbons are difficult to be decomposed during the plasma discharging, compared to straight-chain hydrocarbons. Therefore, the hydrocarbon is preferably a straight-chain lower hydrocarbon, and, in particular, the use of ethylene enables forming a medium-protecting layer having high degrees of density and hardness.

In general, since the film hardness of a carbon film formed by the CVD method is enhanced compared to a film formed by a sputtering process, the perpendicular magnetic recording layer can be more effectively protected from impact from the magnetic head.

Furthermore, after the formation of the film by the CVD method, the medium-protecting layer 26 is exposed to a nitrogen atmosphere at a flow rate of 100 to 350 sccm for surface treatment such that the number ratio (N/C) of nitrogen (N) atoms and carbon (C) atoms is 0.050 to 0.150. Here, when the N/C is smaller than 0.05, high fly write frequently occurs to cause errors in the recording/reproduction process, and an N/C of larger than 0.150 has a high possibility of crash. Accordingly, the N/C is regulated to be 0.05 to 0.15. Therefore, by regulating the N/C in the range of 0.05 to 0.15, the medium-protecting layer formed by CVD can have suitable adhesion to a lubrication layer and suitable hardness.

Here, the number ratio (N/C) of nitrogen atoms to carbon atoms can be measured using an X-ray photoelectron spectroscopy (hereinafter called ESCA (electron spectroscopy for chemical analysis)). Details are that the number ratio of nitrogen atoms to carbon atoms is determined on the basis of the intensities of N1s spectrum and C1s spectrum measured by ESCA.

In the embodiment, the thickness of the medium-protecting layer 26 is preferably 1 nm or more. A thickness of smaller than 1 nm reduces the coverage of the medium-protecting layer 26 and may be therefore insufficient for preventing the migration of metal ions of the magnetic layer and further may cause a problem in wear resistance. It is not particularly necessary to determine an upper limit in the thickness of the medium-protecting layer formed by CVD, but the thickness is preferably set to 3 nm or less from a practical viewpoint not to prevent the improvement in magnetic spacing.

Furthermore, it is preferable to apply a bias voltage of −300 to −50 V when the medium-protecting layer 26 is formed. When the voltage is lower than −300 V, an excessive energy is applied to a substrate to cause arcing, which is responsible for particles and contamination. On the other hand, when the voltage is higher than −50 V, the effect of the bias application does not appear. Accordingly, the application voltage is determined to −300 to −50 V.

Then, after the formation of the medium-protecting layer 26, the surface quality of the perpendicular magnetic recording disk 100 can be enhanced by washing with ultrapure water and isopropyl alcohol.

Because of the above-described medium-protecting layer 26, problems in, for example, load unload (hereinafter simply referred to as LUL) durability do not occur even if the thickness of the medium-protecting layer is 3 nm or less, though conventionally produced productions having thicknesses of 3 nm or less cause durability abnormality such as scratch and deterioration of, for example, the reproduced signals in high fly write.

The lubrication layer 28 was formed by dip-coating PFPE (perfluoro polyether). The thickness of the lubrication layer 28 is about 1 nm. By the effect of the lubrication layer 28, the medium-protecting layer 26 can be prevented from damage or chipping even if the magnetic head is brought into contact with the surface of the perpendicular magnetic recording disk 100. The perfluoro polyether has a linear-chain structure and exhibits lubrication performance suitable for the perpendicular magnetic recording disk and also can exhibit high adhesion performance to the medium-protecting layer 26 due to the hydroxyl (OH) group provided in the end group. In particular, in the configuration of the embodiment in which a surface treatment layer containing nitrogen is provided on a surface of the medium-protecting layer, since ($N^+$) and ($OH^-$) have high affinity to each other, a high adhesion rate of the lubrication layer can be obtained, which is preferable.

In addition, as the perfluoro polyether compound having a hydroxyl group in the end group, the number of the hydroxyl group is preferably two to four per molecule. This is because that when the number is smaller than two, the adhesion rate of the lubrication layer may be decreased, and when the number is greater than four, the lubrication performance may be reduced as a result of the adhesion rate that is too increased. The thickness of the lubrication layer may be properly controlled in the range of 0.5 to 1.5 nm. This is because that a thickness smaller than 0.5 nm may reduce the lubrication performance and that a thickness greater than 1.5 nm may reduce the adhesion rate of the lubrication layer.

The surface roughness, as the Rmax, of the thus produced perpendicular magnetic recording disk 100 is preferably 2.5 nm or less. This is because that a roughness greater than 2.5 nm may inhibit the reduction of the magnetic spacing. The surface roughness is specified in Japanese Industrial Standards (JIS) B0601.

According to the production process above, the perpendicular magnetic recording disk 100 was obtained. The grounds for the above-described parameters are shown below.

As described above, in the AFC structure in the soft magnetic layer 14, the axes of easy magnetization of the upper and the lower two layers disposed in antiparallel to each other are usually destroyed by heat of a certain temperature or higher. This reduces the S/N ratio. However, an AFC structure that is strong to heat is formed by mixing iron to the soft magnetic layer during the formation thereof. This makes it possible to perform the below-described heating immediately before the formation of the medium-protecting layer.

Figure 3:
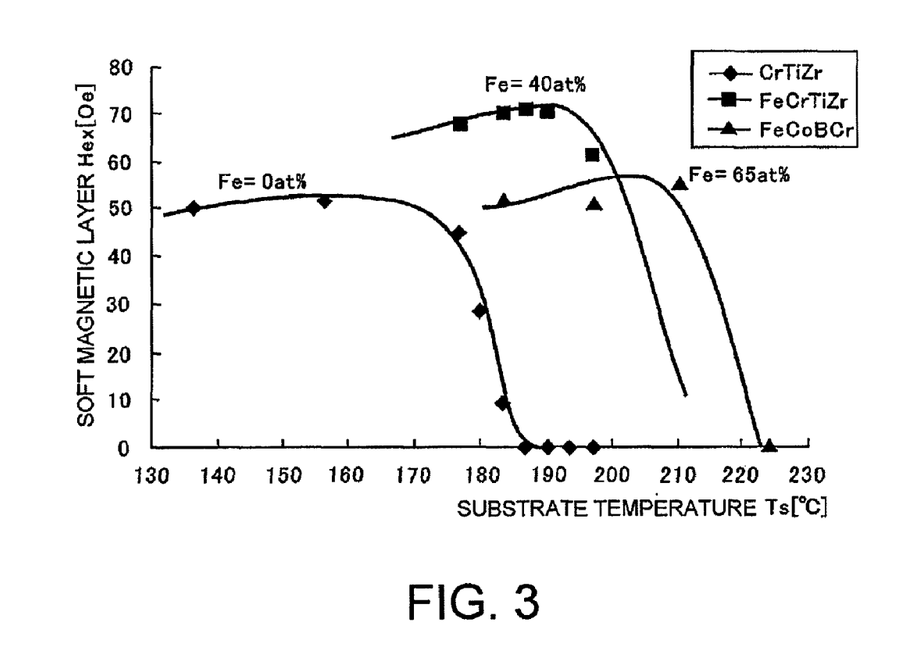
FIG. 3 is an explanatory diagram showing a relationship between the substrate temperature of perpendicular magnetic recording media containing Fe at various concentrations and the intensity of exchange coupling magnetic fields Hex due to AFC.

FIG. 3 is an explanatory diagram showing a relationship between the substrate temperature of the perpendicular magnetic recording disks 100 containing Fe at various concentrations and the intensity of exchange coupling magnetic fields Hex due to AFC. Referring to FIG. 3, it is seen that when the substrate temperature exceeds a certain temperature, the Hex intensity is sharply reduced not to function as the AFC structure. The temperature at such a boundary point (the below-described blocking temperature) varies depending on the Fe concentration, and the boundary temperature increases with the Fe concentration.

For example, the boundary temperature of CoTaZr not containing Fe is about 177° C. The boundary temperature of FeCoTaZr containing 40 at % Fe is about 197° C., and that of FeCoBCr containing 65 at % Fe is about 210° C. The boundary temperature has a certain degree of regularity regardless of the composition of the material that binds to Fe.

Figure 4:
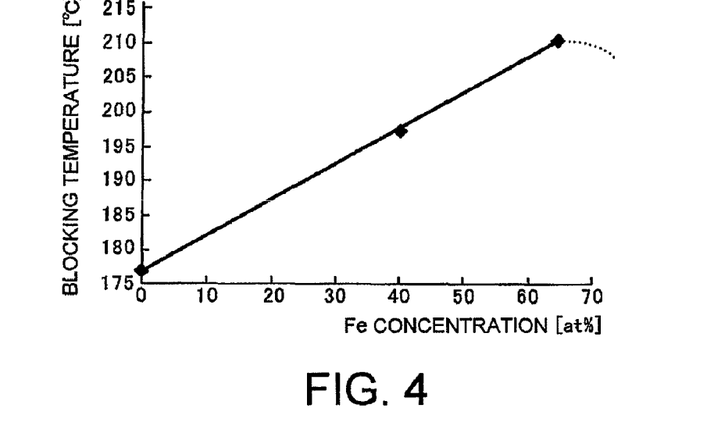
FIG. 4 is an explanatory diagram showing a relationship between the Fe concentration and the blocking temperature.

FIG. 4 is an explanatory diagram showing a relationship between the Fe concentration and the blocking temperature (boundary temperature). Referring to FIG. 4, it is seen that the blocking temperatures of the above-mentioned CoTaZr, FeCoTaZr, and FeCoBCr can be approximately linearized so as to be proportional to the Fe concentration and that the temperature heating the perpendicular magnetic recording disk 100 can be increased by increasing the Fe concentration. Here, the blocking temperature (blocking temperature) is a temperature at which the Hex starts to decrease.

In the embodiment, the blocking temperature can be increased up to about 190 to 215° C. by adding 30 to 70 at % Fe to the soft magnetic layer 14.

Figure 5:
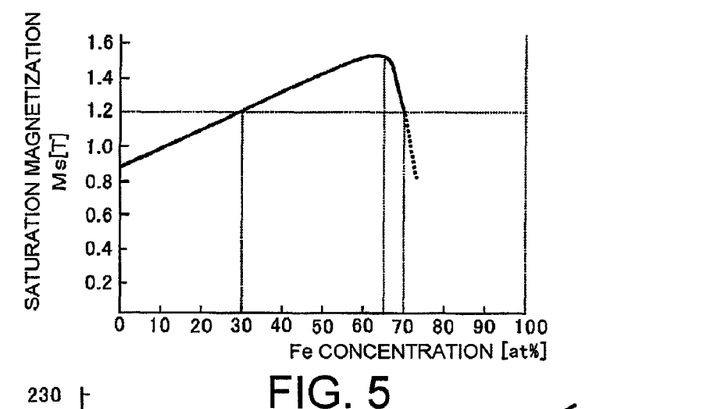
FIG. 5 is an explanatory diagram showing a relationship between the Fe concentration and the saturation magnetization Ms.

FIG. 5 is an explanatory diagram showing a relationship between the Fe concentration and the saturation magnetization Ms. Referring to FIG. 5, it is seen that the soft magnetic layer 14 has a saturation magnetization of 1.2 T or more even if the soft magnetic layer 14 contains 30 to 70 at % Fe. In addition, when the soft magnetic layer 14 contains 65% Fe, the peak of the saturation magnetization Ms is the maximum value 1.60. This reveals that the soft magnetic layer 14 containing 30 to 70 at % Fe has sufficient overwrite characteristics.

Then, the relationship between the heat treatment immediately before the formation of the medium-protecting layer 26 and the peak ratio Dh/Gh after the heating will be described.

Figure 6:
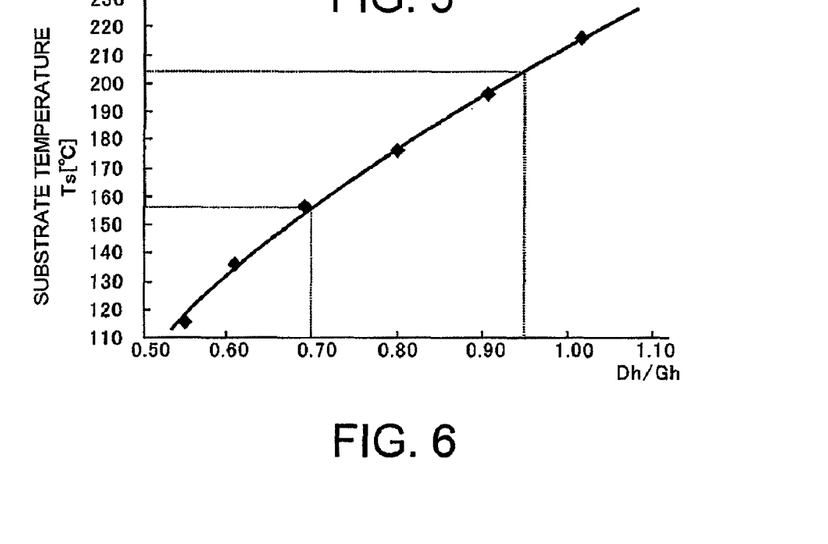
FIG. 6 is an explanatory diagram showing a relationship between the substrate temperature immediately before the formation of the medium-protecting layer and the peak ratio Dh/Gh after the heating.

FIG. 6 is an explanatory diagram showing a relationship between the substrate temperature immediately before the formation of the medium-protecting layer 26 and the peak ratio Dh/Gh after the heating. As understood by referring to FIG. 6, the peak ratio Dh/Gh gradually increases as a function to the substrate temperature, that is, an increase in the substrate temperature increases the peak ratio Dh/Gh, in other words, increases the number of diamond-like bonds. This enhances the resistance of the medium-protecting layer 26.

The preferred value of the peak ratio Dh/Gh in the embodiment is 0.70 to 0.95 as described above. It can be comprehended by referring to FIG. 6 that the substrate temperature for achieving such the peak ratio Dh/Gh is 157 to 204° C.

Figure 7:
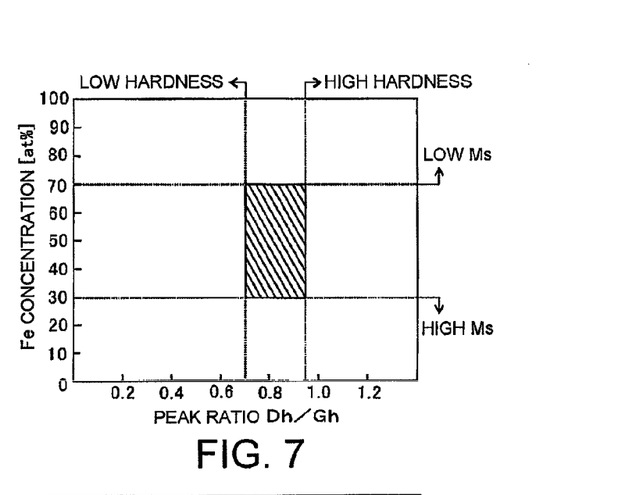
FIG. 7 is an explanatory diagram showing a relationship between the Fe concentration and the peak ratio Dh/Gh after the heating.

FIG. 7 is an explanatory diagram showing a relationship between the Fe concentration and the peak ratio Dh/Gh after the heating. As shown in FIG. 7, when the Fe content in the soft magnetic layer 14 is less than 30 at % or higher than 70 at %, the saturation magnetization Ms of the soft magnetic layer 14 is low not to satisfy the requirement of a saturation magnetization Ms of 1.2 T. Therefore, the perpendicular magnetic recording disk 100 having such the soft magnetic layer 14 cannot maintain the required overwrite characteristics. In addition, when the Fe content is 70% or more, corrosion characteristics are significantly reduced not to be used as a medium.

Furthermore, when the peak ratio Dh/Gh is smaller than 0.70, the hardness of the medium-protecting layer 26 is too low. Therefore, the scratches are easily formed, and the reliability of the perpendicular magnetic recording disk 100 is reduced. Similarly, when the peak ratio Dh/Gh is larger than 0.95, the hardness of the medium-protecting layer 26 is too high. Therefore, the brittleness is increased, and the reliability of the perpendicular magnetic recording disk 100 is reduced.

Accordingly, when the Fe content in the soft magnetic layer 14 is 30 to 70 at % and the peak ratio Dh/Gh of the medium-protecting layer 26 is controlled within the range of 0.70 to 0.95, a perpendicular magnetic recording disk 100 having sufficient overwrite characteristics and being excellent in reliability can be obtained.

The effectiveness of the embodiment will be described referring to the following examples and comparative examples.

Figure 8:
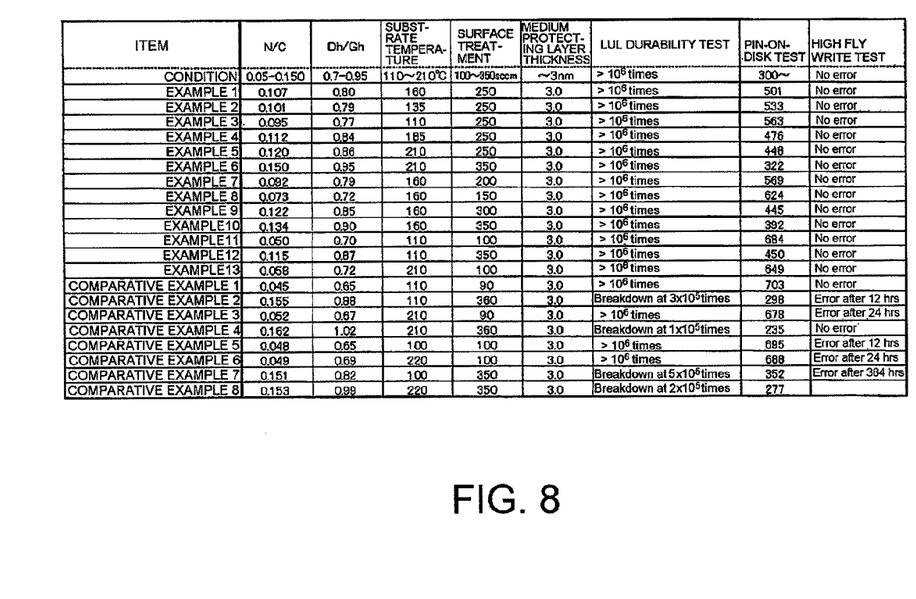
FIG. 8 is an explanatory diagram showing parameters and effectiveness in examples and comparative examples.

FIG. 8 is an explanatory diagram showing parameters and effectiveness in the examples and the comparative examples. Here, in thirteen examples and eight comparative examples, an LUL durability test, a pin-on-disk test, and a high fly write test are performed for evaluating effectiveness.

Here, an amorphous glass substrate was used as the substrate 10. The composition thereof is aluminosilicate. The glass substrate was a substrate for a 2.5-inch-type perpendicular magnetic recording disk having a diameter of 65 mm, an inner diameter of 20 mm, and a disk thickness of 0.635 mm. Here, the surface roughness of the resulting glass substrate was observed with an AFM (atomic force microscope) to confirm that the glass substrate had a smooth surface having an Rmax of 2.18 nm and an Ra of 0.18 nm.

Then, an adhesion layer 12, a soft magnetic layer 14, an orientation control layer 16, an under layer 18, an onset layer 20, a magnetic recording layer 22, and a capped layer 24 were sequentially formed on the substrate 10 by DC magnetron sputtering with a C3040 sputtering machine manufactured by Canon Anelva Corp. The vacuum pressure during the film formation was 0.6 Pa. Detailed description of the film formation is as follows.

The under layer 18 made of Pd and having a thickness of 7 nm was formed by sputtering on the orientation control layer 16 using Pd as the sputtering target. The vacuum pressure during the film formation was 1.0 Pa.

The magnetic recording layer 22 with a 15 nm thickness made of a CoCrPt—$TiO_2$ alloy was formed by sputtering on the onset layer 20 using a sputtering target composed of a CoCrPt—$TiO_2$ (Cr: 12 at %, Pt: 10 at %, $TiO_2$: 9 at %, remainder: Co) alloy as the sputtering target. The vacuum pressure during the film formation was 3.5 Pa.

Furthermore, the surface of the perpendicular magnetic recording disk 100 after the formation of the capped layer 24 was preheated. For example, in Example 1, the perpendicular magnetic recording disk 100 was heated such that the surface temperature of the perpendicular magnetic recording disk 100 became 160° C. by a heating method using a heater. The heating time is about 5 seconds. In addition, the substrate temperature of the perpendicular magnetic recording disk 100 was confirmed immediately after the formation of the magnetic layer from a window of a chamber using a radiation thermometer.

Furthermore, a medium-protecting layer 26 was formed on the disk that was formed till the magnetic recording layer 22 by a plasma CVD method by introducing ethylene gas at 250 sccm under a vacuum pressure of 1 Pa and an applied bias voltage of −300 V. The film-forming rate for forming the medium-protecting layer 26 was 1 nm/sec.

Furthermore, after the formation of the medium-protecting layer 26, the medium-protecting layer 26 was exposed to a nitrogen atmosphere under a pressure controlled to a vacuum pressure of 3 Pa by introducing only nitrogen gas at 250 sccm into the plasma. Thus, treatment for impregnating the surface of the medium-protecting layer 26 with nitrogen was conducted.

After the formation of the medium-protecting layer 26, the thickness of the medium-protecting layer 26 was measured by cross-section observation with a transmission electron microscope (TEM). The thickness of the medium-protecting layer 26 was 3.0 nm.

In addition, after the formation of the medium-protecting layer 26, the number ratio (N/C) of nitrogen atoms to carbon atoms of the medium-protecting layer 26 was confirmed by ESCA. The value was 0.107. The measurement conditions of the ESCA analysis are as follows:

Apparatus: Quantum2000 manufactured by Ulvac-Phi Inc.,
X-ray excitation source: Al—Kα ray (1486.6 eV),
X-ray source: 20 W,
Vacuum pressure of analysis chamber: $<2\times10^{-7}$ Pa,
Pass energy: 117.5 eV,
Photoelectron detection angle: 45°,
Measurement subject peak: C1s and N1s,
Analysis region: 100 um φ, and
Cumulated number: ten times.

In addition, Raman spectroscopic analysis after the formation of the medium-protecting layer 26 showed a Dh/Gh of 0.80.

In addition, the Raman spectroscopic analysis was performed by irradiating the surface of the medium-protecting layer 26 with Ar ion laser having a wavelength of 514.5 nm and observing the Raman spectrum due to Raman scattering appearing in a wavenumber band of 900 to 1800 cm$^{-1}$.

Figure 9:
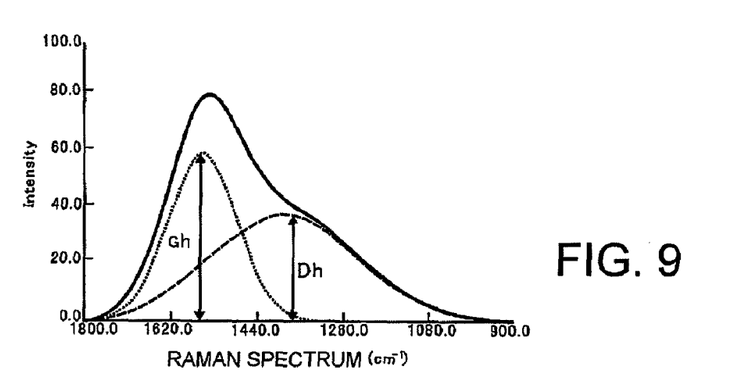
FIG. 9 is an explanatory diagram illustrating an image of a Raman spectrum.

FIG. 9 is an explanatory diagram illustrating an image of a Raman spectrum. Here, in the wavenumber range of 900 to 1800 cm$^{-1}$ of the Raman spectrum, background due to fluorescence was amended to straight-line approximation, and the peak height ratio of the D peak to the G peak was determined as the Dh/Gh.

The Raman spectroscopic analysis is usually conducted before the application of the lubrication layer 28, but the Raman spectrum may be measured after the application of a lubricant. The Raman spectroscopic analysis conducted before and after the application of a lubricant showed that the Dh/Gh values were exactly the same before and after the application and revealed that the perfluoro polyether-based lubrication layer having hydroxyl groups in the end groups did not affect the Raman spectroscopic analysis.

After the formation of the medium-protecting layer 26, immersion cleaning in pure water at 70° C. was conducted for 400 seconds, and then washing with IPA was further conducted for 400 seconds. As finishing drying, drying with IPA vapor was conducted.

Then, on the medium-protecting layer 26 washed with ultrapure water and IPA, a lubrication layer 28 made of a PFPE (perfluoro polyether) compound was formed by a dip method. Specifically, an alcohol denatured Fomblin Z derivative manufactured by Ausimont Co., Ltd. was used. The compound has one or two hydroxyl groups on each end of a main chain of PFPE, that is, the compound has two to four hydroxyl groups per molecule in the end groups. The thickness of the lubrication layer 28 was 1.4 nm.

As in above, the produced perpendicular magnetic recording disk 100 was observed for the surface roughness with an AFM to confirm that the surface had an Rmax of 2.30 nm and a Ra of 0.22 nm and was smooth. In addition, the glide height was measured to be 3.2 nm. When the flying height of the magnetic head is stably set to 10 nm or less, it is desirable that the glide height of the perpendicular magnetic recording disk 100 be set to 4.0 nm or less.

The perpendicular magnetic recording disk 100 obtained as mentioned above was evaluated and analyzed for the various performances thereof in the following manner.

(Lul Durability Test)

An LUL durability test was conducted using a 2.5-inch-type HDD being rotated at 5400 rpm and a magnetic head having a flying height of 10 nm. Incidentally, an NPAB (negative-pressure type) slider was used as a slider of the magnetic head, and a TMR type element loaded with a DFH mechanism was used as a reproducing element. The perpendicular magnetic recording disk 100 was loaded on the HDD, and LUL operation was continuously performed by the above-described magnetic head.

Then, the LUL durability of the perpendicular magnetic recording disk 100 was evaluated by measuring the endurable number of LUL without causing breakdown in the HDD. The environment for conducting the test was 70° C./80% RH, which is a severer condition than usual HDD operating environment. This is for more adequately determining the endurance reliability of the perpendicular magnetic recording disk 100 by conducting the test under the environment operating an HDD that is supposed to be used in, for example, a car navigation system.

In the LUL durability test, the perpendicular magnetic recording disk 100 in each of Examples 1 to 13 exhibited the number of LUL greater than $1\times10^6$ times without causing breakdown thereof. Usually, in the LUL durability test, it is required that the number of continuous LUL not causing breakdown be greater than $4\times10^5$ times. The number of LUL of $4\times10^5$ times is comparable to the use of about 10 years under the usual environment operating HDDs.

(Pin-on-Disk Test)

The pin-on-disk test was conducted as follows. That is, in order to evaluate the durability and the wear resistance of the medium-protecting layer 26, the perpendicular magnetic recording disk 100 was rotated while a 2 mm diameter ball made of $Al_2O_3$—TiC was pressed at a load of 15 g to the medium-protecting layer 26 at a position corresponding to 22 mm in radius of the perpendicular magnetic recording medium for rotatively sliding the $Al_2O_3$—TiC ball at a relative velocity of 2 m/sec with respect to the medium-protecting layer 26. The number of sliding rotations until the occurrence of breakage in the medium-protecting layer 26 caused by the sliding was measured.

In the pin-on-disk test, if the number of the sliding rotations until the occurrence of breakage in the medium-protecting layer 26 is 300 or more, it is determined to pass the test. In addition, usually, the magnetic recording head is not brought into contact with the perpendicular magnetic recording disk 100. Therefore, this pin-on test is a durability test under severe environment compared to actual environment for use. For example, the number of the sliding rotations of the perpendicular magnetic recording disk 100 of Example 1 was 501 times, and those in all other examples were higher than 300 times.

(High Fly Write Test)

The high fly write test was conducted as follows. A 2.5-inch-type HDD that rotates at 5400 rpm and a magnetic head with a flying height of 10 nm are used. In addition, an NPAB (negative-pressure type) slider was used as a slider of the magnetic head, and a TMR type element loaded with a DFH mechanism was used as a reproducing element. The perpendicular magnetic recording disk 100 was loaded on the HDD, and the DFH mechanism was operated to generate heat in the head element. The magnetic head was thermally expanded with the heat to protrude in the ABS direction by 2 nm. Under this state, recording/reproduction was conducted for 1000 hours, and occurrence of failure by error was investigated. As a result, error did not occur in the recording/reproduction for 1000 hours in Examples 1 to 13.

The comparative examples were also subjected to the LUL durability test, the pin-on-disk test, and the high fly write test as in the above-described examples.

For example, in Comparative Example 1, a perpendicular magnetic recording disk was formed as in Example 1 except that the medium-protecting layer 26 was exposed to nitrogen gas at 90 sccm. However, since the amount of introduced nitrogen was too small, in the high fly write test, the failure that no recording/reproduction was performed occurred 12 hours after the starting.

In addition, in Comparative Example 2, since the exposure to nitrogen gas at 360 sccm was conducted, the amount of introduced nitrogen was too large. Therefore, the specification, 300 times, in the pin-on test disk test was not achieved, and scratches occurred in the perpendicular magnetic recording disk in the LUL test to cause crash at $3 \times 10^5$ times. It can be understood that other comparative examples do not satisfy acceptable values of one or a plurality of the LUL durability test, the pin-on-disk test, and the high fly write test when one or a plurality of parameters are different from those in Example 1 and deviate from predetermined ranges.

Figure 10:
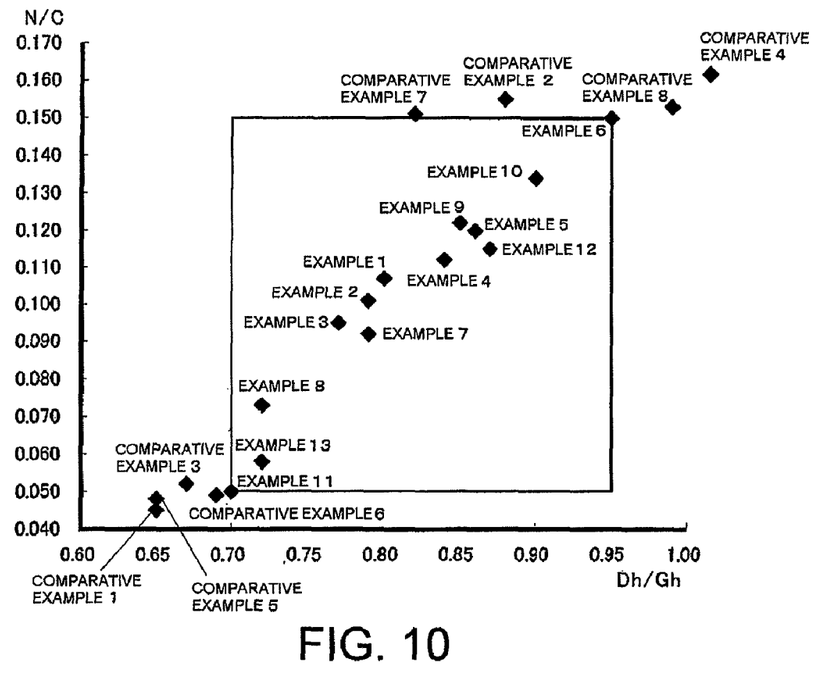
FIG. 10 is a plot diagram in which values of N/C and Dh/Gh in the examples and the comparative examples are plotted.

FIG. 10 is a plot diagram in which values of N/C and Dh/Gh in the examples and the comparative examples are plotted. As seen by referring the examples in the N/C range of 0.050 to 0.150 and the Dh/Gh range of 0.70 to 0.95 indicated by a solid-line square in the drawing and the comparative examples outside the range, the perpendicular magnetic recording disks 100 according to the embodiment can be also applied to a DFH head and can avoid high fly write failure even if the thickness of the medium-protecting layer is 3 nm or less and further have suitable wear resistance and sliding characteristics. In addition, it is obvious that the perpendicular magnetic recording disk 100 according to the embodiment can be applied to an HDD of an LUL system.

As in above, the preferred examples of the present invention have been described referring to the accompanied drawings, but it is obvious that the present invention is not limited to such examples. It is evident that those skilled in the art can arrive at various alterations and modifications within the scope described in Claims, and it is understood that those alterations and modifications surely belong to the technical scope of the present invention.

INDUSTRIAL APPLICABILITY

The present invention can be used in a perpendicular magnetic recording medium that is loaded on, for example, an HDD and in a process of producing the medium.

The invention claimed is:

1. A perpendicular magnetic recording medium comprising:
   a substrate;
   a magnetic recording layer on said substrate, and a medium-protecting layer on the magnetic recording layer, wherein the magnetic recording layer is a ferromagnetic layer of a granular structure having grain boundaries formed by a non-magnetic material among crystalline particles grown in a columnar shape and containing at least cobalt (Co);
   the medium protecting layer has a thickness in the range between 1.0 nm and less than 3.0 nm; and
   the medium-protecting layer is composed of a coating that includes carbon as a main component and nitrogen contained in a surface layer at a number ratio (N/C) of nitrogen (N) atoms and carbon (C) atoms of 0.090 to 0.150, and in a spectrum removed fluorescence from a Raman spectrum in wavenumbers of 900 to 1800 cm$^{-1}$ obtained by exciting the medium-protecting layer with argon ion laser light having a 514.5 nm wavelength, a peak ratio Dh/Gh when a D peak Dh appearing near 1350 cm$^{-1}$ and a G peak Gh appearing near 1520 cm$^{-1}$ are waveform-separated by a Gaussian function is no less than 0.075 to less than 0.95.

2. A perpendicular magnetic recording medium comprising:
   a substrate;
   a magnetic recording layer on the substrate, and
   a medium-protecting layer on the magnetic recording layer, wherein
   the magnetic recording layer is a ferromagnetic layer of a granular structure having grain boundaries formed by a non-magnetic material among crystalline particles grown in a columnar shape and containing at least cobalt (Co); and
   the medium-protecting layer is composed of a coating that includes carbon as a main component and nitrogen contained in a surface layer at a number ratio (N/C) of nitrogen (N) atoms and carbon (C) atoms of 0.050 to 0.150, and in a spectrum removed fluorescence from a Raman spectrum in wavenumbers of 900 to 1800 cm$^{-1}$ obtained by exciting the medium-protecting layer with argon ion laser light having a 514.5 nm wavelength, a peak ratio Dh/Gh when a D peak Dh appearing near 1350 cm$^{-1}$ and a G peak Gh appearing near 1520 cm$^{-1}$ are waveform-separated by a Gaussian function is 0.70 to 0.95,
   said medium further comprising a soft magnetic layer below the magnetic recording layer, wherein the soft magnetic layer is formed so as to have an antiferromagnetic exchange coupling (AFC) structure containing 30 to 70 at % iron (Fe) and has a saturation magnetization Ms of 1.2 T or more.

3. The perpendicular magnetic recording medium according to claim 2, wherein the soft magnetic layer has an exchange coupling magnetic field Hex of 40 Oe or more.

4. A perpendicular magnetic recording medium comprising:
   a substrate;
   a magnetic recording layer on the substrate, and
   a medium-protecting layer on the magnetic recording layer, wherein
   the magnetic recording layer is a ferromagnetic layer of a granular structure having grain boundaries formed by a non-magnetic material among crystalline particles grown in a columnar shape and containing at least cobalt (Co);
   the medium-protecting layer is composed of a coating that includes carbon as a main component and nitrogen contained in a surface layer at a number ratio (N/C) of nitrogen (N) atoms and carbon (C) atoms of 0.090 to 0.150, and in a spectrum removed fluorescence from a Raman spectrum in wavenumbers of 900 to 1800 cm$^{-1}$ obtained by exciting the medium-protecting layer with argon ion laser light having a 514.5 nm wavelength, a peak ratio Dh/Gh when a D peak Dh appearing near 1350 cm$^{-1}$ and a G peak Gh appearing near 1520 cm$^{-1}$ are waveform-separated by a Gaussian function is no less than 0.75 to less than 0.95, said medium further comprising a capped layer on the magnetic recording layer having a composition different from that of the magnetic recording layer and a perpendicular magnetic anisotropy, and the magnetic recording layer is formed so as to have a granular structure.

5. The perpendicular magnetic recording medium according to claim 4, wherein the capped layer has a composition of CoCrPtB.

6. The perpendicular magnetic recording medium according to claim 1, wherein the medium-protecting layer has increased diamond-like bonds resulting from heating the magnetic layer immediately before forming the medium protecting layer within a temperature range of 157° C.-204° C., with regard to a medium protecting layer that is not heated above 120° C. before forming the medium protecting layer.

7. The perpendicular magnetic recording medium according to claim 4, wherein the medium-protecting layer has increased diamond-like bonds resulting from heating the magnetic layer immediately before forming the medium protecting layer within a temperature range of 157° C.-204° C., with regard to a medium protecting layer that is not heated above 120° C. before forming the medium protecting layer.

* * * * *